March 13, 1951    J. H. HAMMOND, JR., ET AL    2,544,677
RADIO TRAIL NAVIGATIONAL SYSTEM
Filed March 6, 1945      6 Sheets-Sheet 1
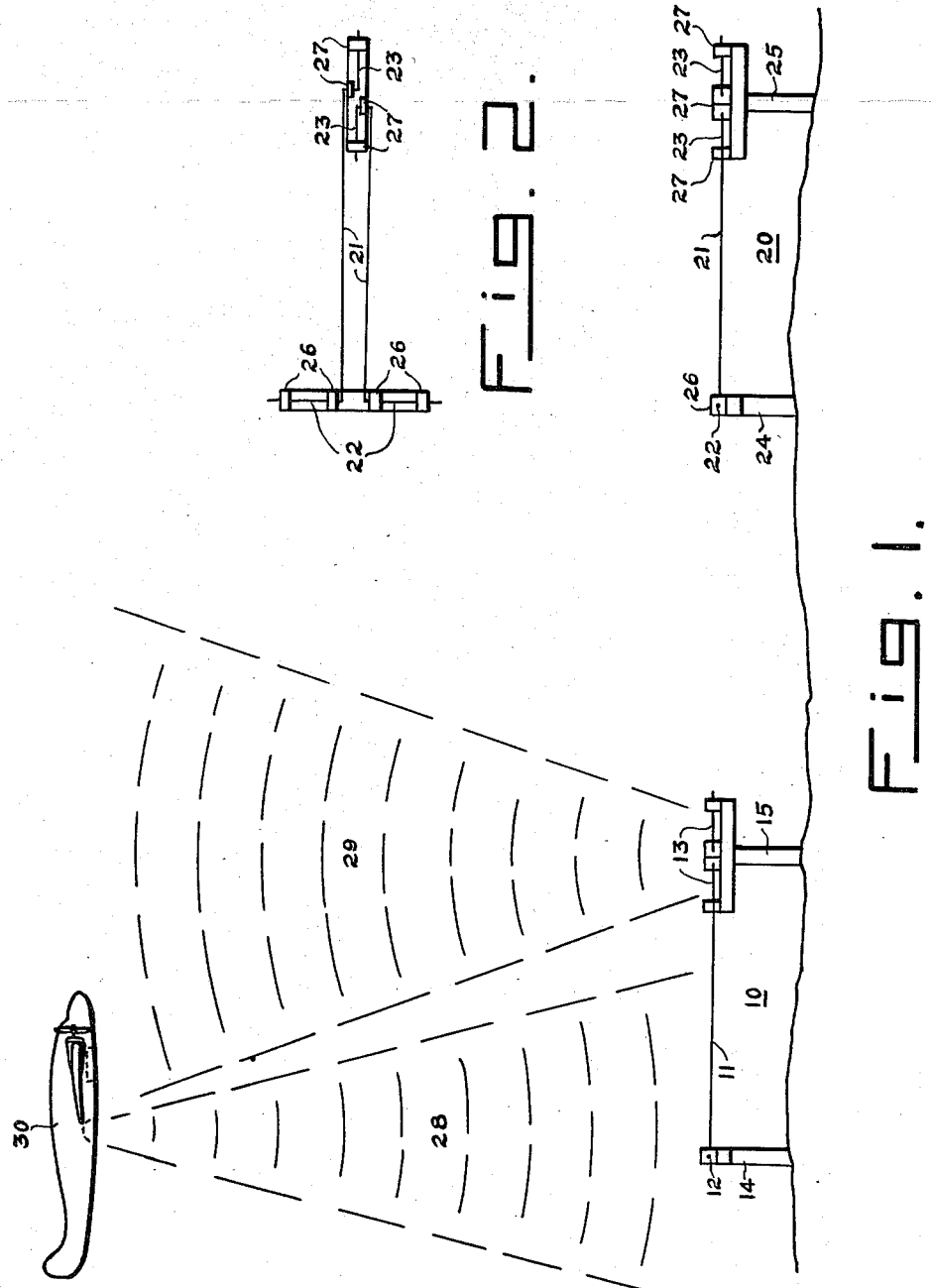
INVENTOR
JOHN HAYS HAMMOND, JR.
BY ELLISON S. PURINGTON.
ATTORNEY March 13, 1951 J. H. HAMMOND, JR., ET AL 2,544,677
RADIO TRAIL NAVIGATIONAL SYSTEM
Filed March 6, 1945 6 Sheets-Sheet 2

INVENTOR
JOHN HAYS HAMMOND, JR.
BY ELLISON S. PURINGTON
ATTORNEY

March 13, 1951     J. H. HAMMOND, JR., ET AL     2,544,677
RADIO TRAIL NAVIGATIONAL SYSTEM Filed March 6, 1945     6 Sheets-Sheet 4

INVENTOR
JOHN HAYS HAMMOND, JR.
BY ELLISON S. PURINGTON.

INVENTOR
JOHN HAYS HAMMOND, JR.
BY ELLISON S. PURINGTON.
ATTORNEY

INVENTOR
JOHN HAYS HAMMOND, JR.
BY ELLISON S. PURINGTON.
ATTORNEY

Patented Mar. 13, 1951

2,544,677

UNITED STATES PATENT OFFICE 2,544,677

RADIO TRAIL NAVIGATIONAL SYSTEM

John Hays Hammond, Jr., and Ellison S. Purington, Gloucester, Mass., assignors, by direct and mesne assignments, to Radio Corporation of America, New York, N. Y., a corporation of Delaware Application March 6, 1945, Serial No. 581,234

5 Claims. (Cl. 343—10)

1

This invention relates to radio trail navigational systems for aircraft and more particularly to a system for indicating to the pilot his location with respect to the trail.

In accordance with the present invention, a radiant energy beam is radiated from the plane in a generally downward direction and energizes the trail to cause the latter to radiate a reflected wave which is received on the plane. Means is provided for swinging either the beam or the receiver in a vertical arc transverse to the line of flight so as to intercept the trail at some point in the arc depending upon the position of the plane to the right or left of the trail. Timed means is provided to indicate the position of the swinging element at the instant of reception of the reflected wave from the trail. The trail is preferably provided with receiving and radiating antennae which are polarized at right angles to each other so that the reflected wave is cross polarized with respect to the transmitted wave. In this way the apparatus can distinguish from waves which are reflected from other objects which the beam may strike.

In one embodiment the transmitter propagates a beam which is fanned out in a direction transverse to the line of flight and the receiving antennae is provided with directional means such as a reflector which is swung transversely to scan for the trail which is continuously energized by the transmitter.

In another embodiment the transmitter is made directional and the indicator means may be synchronized with the swinging of the transmitted beam.

The beam may be swung either mechanically or electrically or by the use of a plurality of directional antennae which are successively energized as will be more fully described. In one embodiment stabilizing means is also provided for eliminating the effect of tilting of the plane carrying the apparatus.

The nature of the invention will be better understood by referring to the following description, taken in connection with the accompanying drawings in which specific embodiments thereof have been set forth for purposes of illustration.

In the drawings:

Fig. 1 is a schematic diagram showing the basic principle of operation of the system with an aircraft flying above a radio trail;

Fig. 2 is a plan view of a trail element from above;

2

Figure 3:
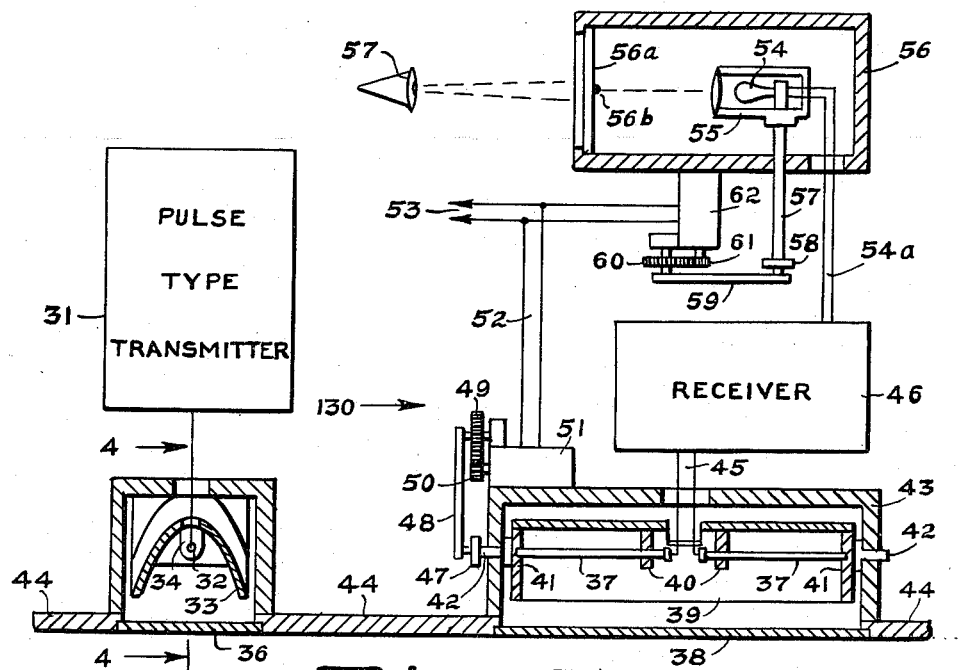
Fig. 3 is a schematic diagram of an aircraft installation embodying the present invention.
Figure 4:
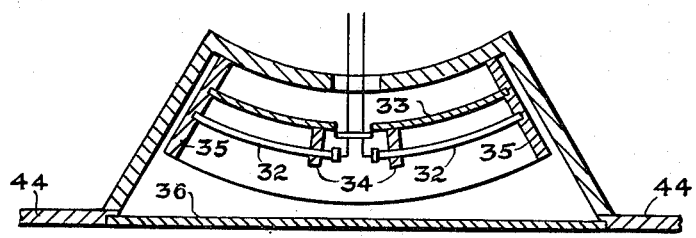
Figure 5:
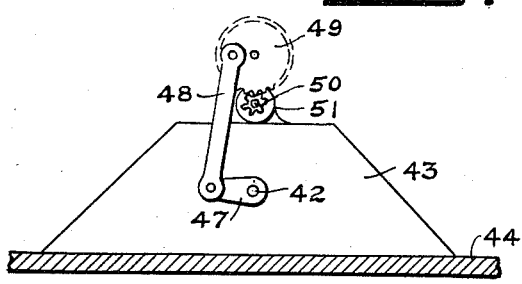
Figure 6:
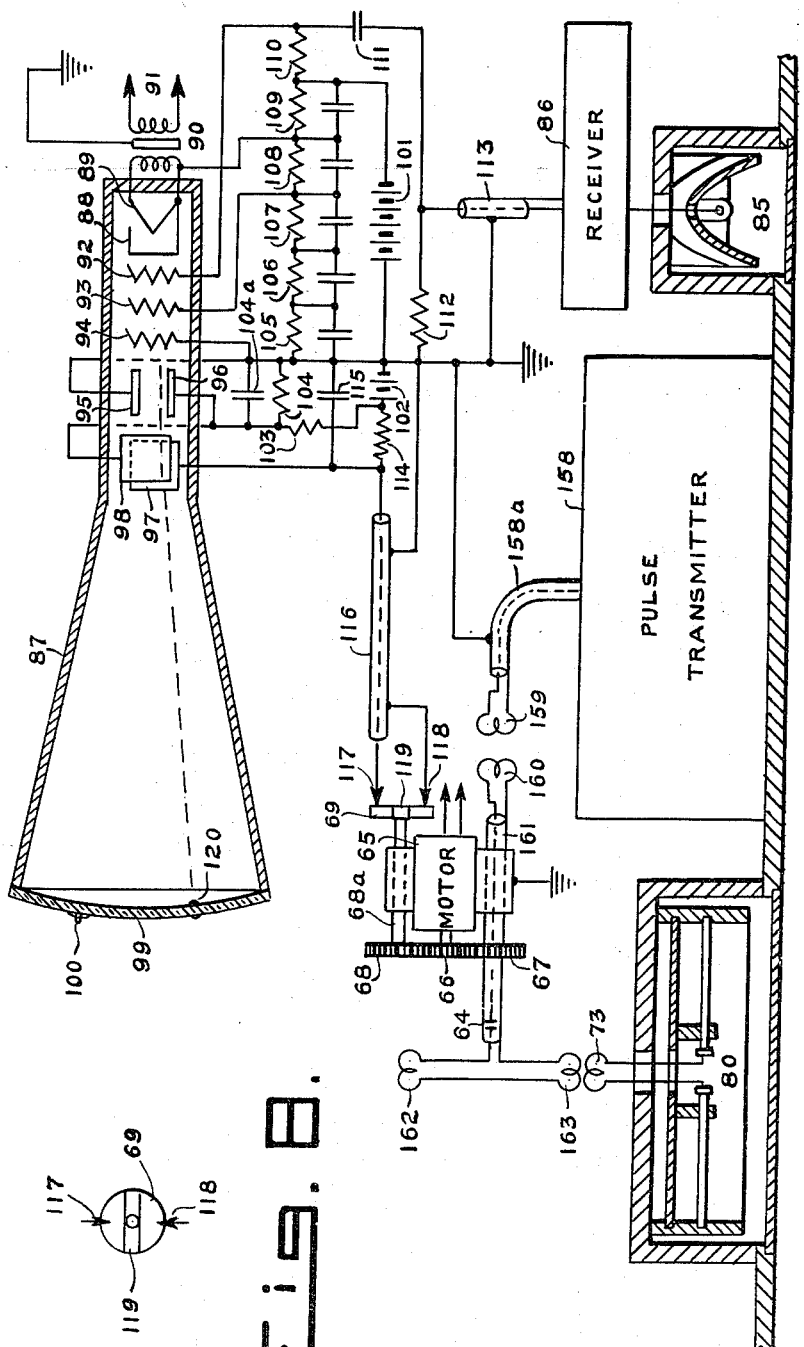
Figure 7:
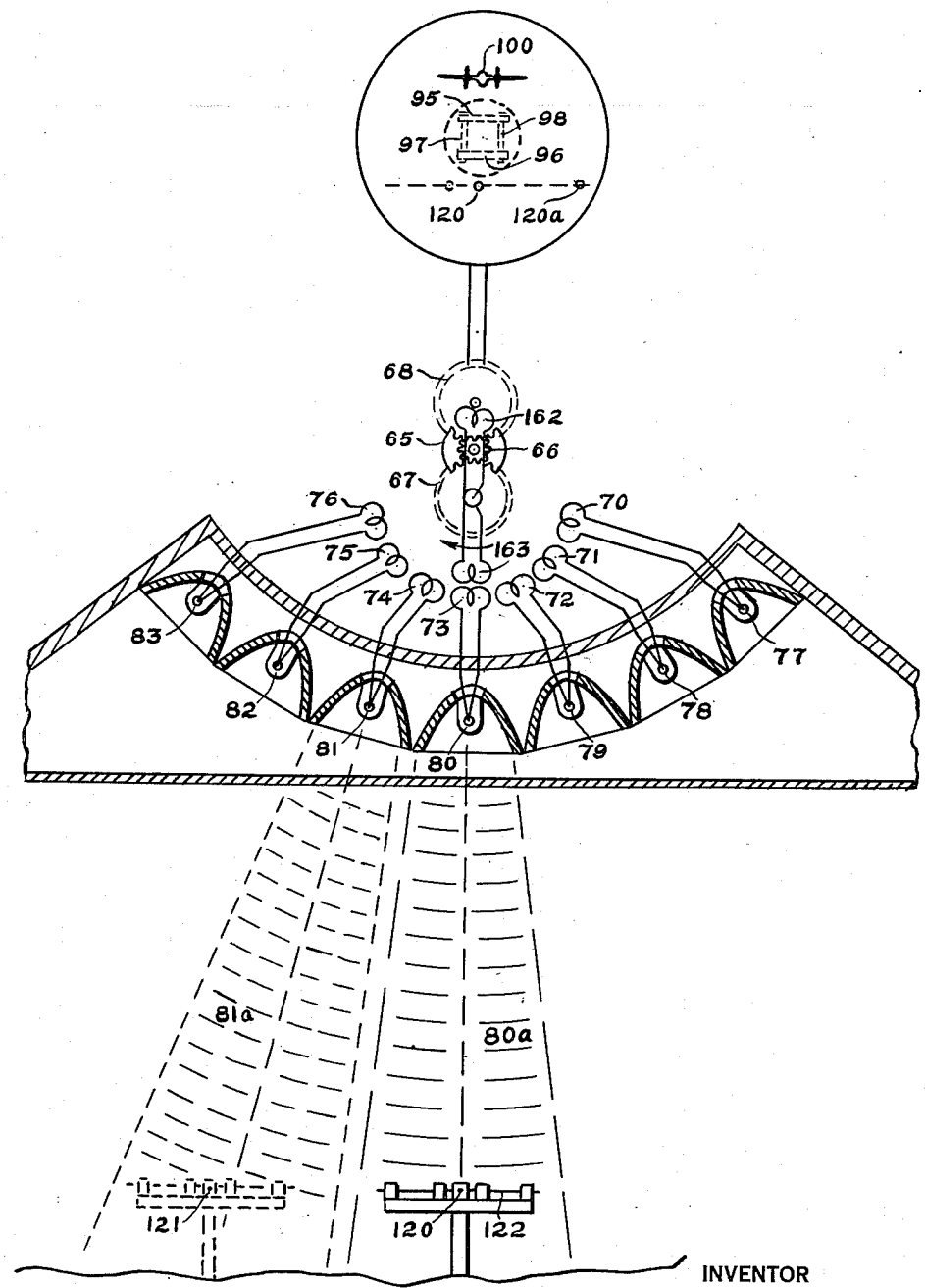
Figures 9, 10:
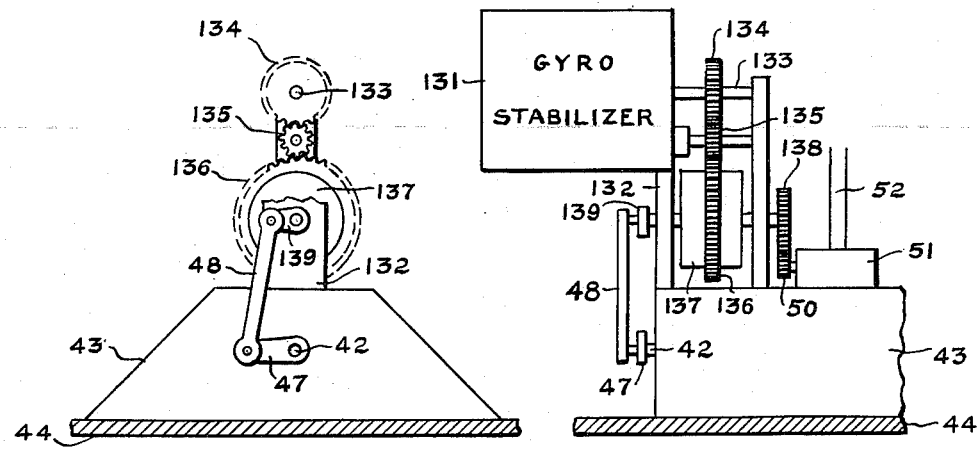
Figure 11:
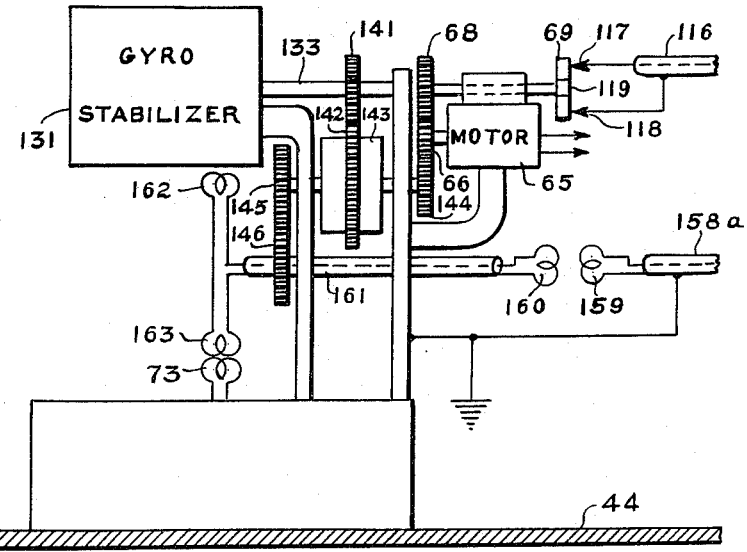

Fig. 4 is a section through the transmitter antenna taken on line 4—4 of Fig. 3;

Fig. 5 is a side elevation of the receiver antenna;

Fig. 6 is a schematic diagram of a modified type of aircraft installation embodying the invention;

Fig. 7 is a detail view of the transmitter antennae and indicator of Fig. 6;

Fig. 8 is an end elevation of the commutator shown in Fig. 6;

Fig. 9 is a side elevation of a gyrostabilized transmitter;

Fig. 10 is an end elevation of the transmitter of Fig. 9;

Fig. 11 is a side elevation of another form of stabilized transmitter; and

Figure 12:
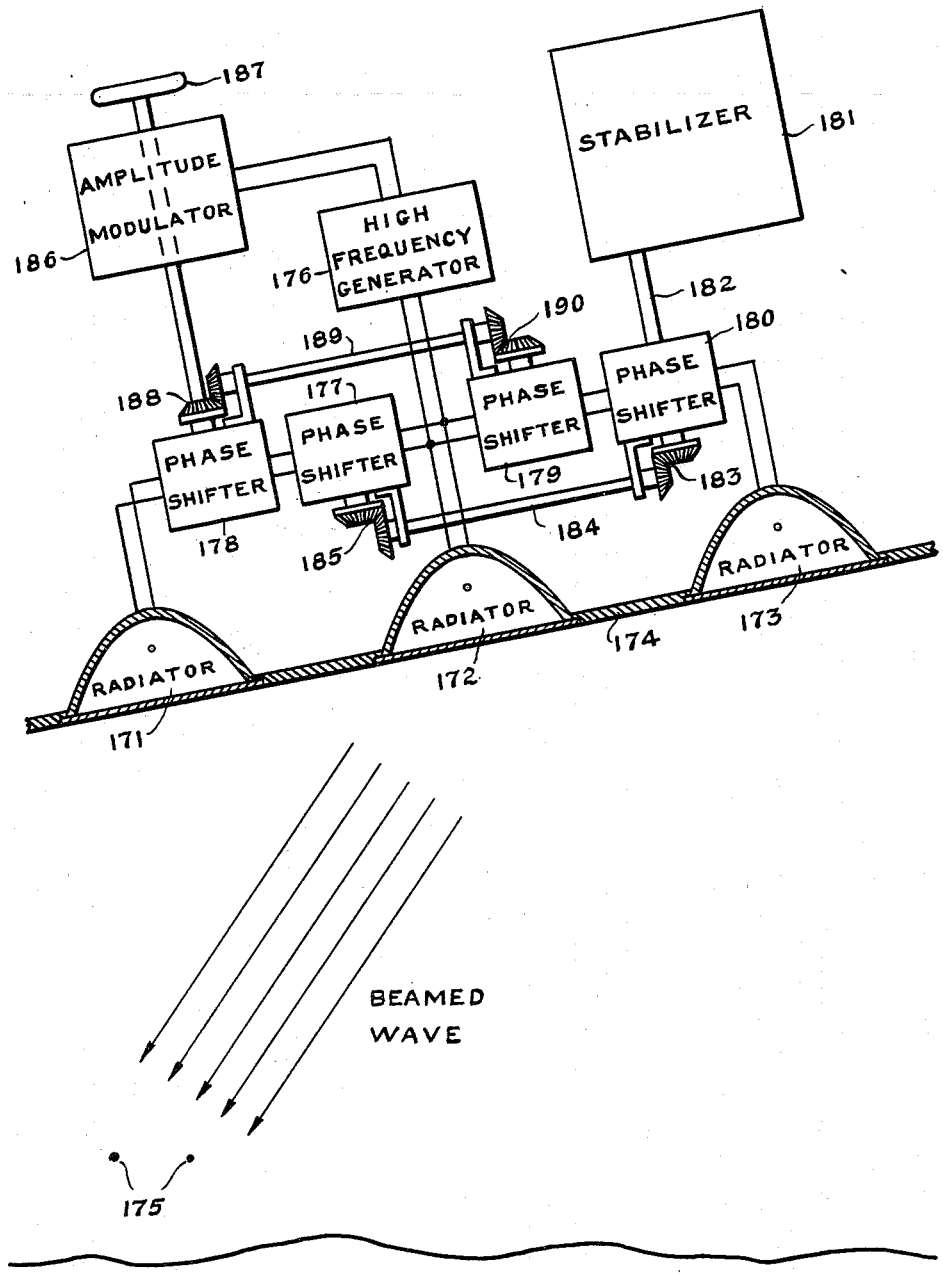

Fig. 12 is a diagrammatic view illustrating a transmitter having electrical means to swing the transmitted beam.

With especial reference to Figs. 1 and 2, the trail is shown as comprising trail elements 10, 20 for receiving radar type energy from a plane 30. The trail elements consist essentially of open wire transmission lines 11, 21 mounted in the direction of normal traffic flow, with one end of the trail elements terminated with antennae 12, 22 best operative for vertical waves with electrical fields polarized transversely to the trail, and their other ends terminated with antennae 13, 23 best operative for vertical waves with electric fields polarized longitudinally with respect to the trail. These conductors are supported on poles 14, 15, 24, 25, and mounted in insulators such as 26, 27, as indicated in Fig. 2.

The aircraft is equipped with a radar type installation for producing transmitted radiation polarized in one sense and for receiving returned energy polarized in the opposite sense. For the trail shown, the transmitted radiations have their electric polarization transverse to the trail and the receiver is responsive to returned energy with its electric polarization longitudinal of the trail. As shown, the airplane is in a position where the radar equipment is commencing to be operative due to element 10 of the trail. The radar equipment is producing a pulse beam 28 which is being picked up by antenna 12, transmitted over non-radiating transmission line 11, and re-radiated from antenna 13. The reradiated beam 29 is being returned to the plane, and is now or shortly will be picked up by the receiving antenna on the plane. The received beam may be distinguished from energy reflected for example from ground or metallic objects by the fact that the beam is returned from a location which is not being directly energized by the transmitter, and by the fact that the beam is returned with a change of the plane of polarization. These facts in connection with the tuning of the trail to the beam frequency provides for high selectivity in permitting the receiver to distinguish between stray reflections and the energy returned from the trail.

It will be understood that the trail antenna 12 responsive to the energy transmitted from the plane may be made more effective in collecting energy from the plane by use of antenna airways, or by feeders along the length of the transmission line as in the well known Beverage antenna. Furthermore in place of discrete trail elements, a more complex element may be used with a plurality of transverse antennas for picking up energy and a plurality of longitudinal antennas for radiating the energy as is well known in the art, and in the limiting case the trail may take the form of a continuous transmission line. These may be suitably directive and suitably spaced to give best indication when the plane is flying at the minimum safe elevation. It will be further understood that the radar equipment may be used for altitude determination as well as for trail navigation purposes. It is further within the scope of this invention to arrange the trail so that it returns signals identifying the position of the plane along the trail.

*Figures 3, 4, 5*

With especial reference to Figs. 3 and 4, a pulse type transmitter 31 is connected to a radiating antenna 32 with reflector 33 mounted in a fixed position at the surface of the aircraft such that the radiated electric field is transverse to the aircraft which in Fig. 3 is assumed to be moving toward the right as indicated by arrow 130. The conductors forming the radiator 32, are suitably mounted in insulators 34, 35 (Fig. 4) and protected from exposure by electro-magnetically transparent cover 36 flush with the aircraft surface. The radiator 32 and reflector 33 are curved about a longitudinal axis as shown in Fig. 4 curved so that the radiated beam will be narrow along the line of flight due to the reflector 33, but suitably broad transversely so that energy will be radiated to the trail in a fan shaped beam regardless of whether it lies to the left or right of the line of flight.

The receiving antenna 37, shown in Fig. 3, is energized through electro-magnetically transparent cover 38 and is backed by a reflector 39. The antenna 37 and reflector 39 are mounted in insulators 40, 41. Secured to the insulators 41 are pivots 42 which are journaled in a casing 43 which is mounted on the aircraft structure 44 to permit the reflector 39 to be swung about on axis extending along the line of flight. Flexible transmission line 45 connects the antenna 37 to a receiver 46.

Secured to the one pivot 42 is an arm 47, to which is pivoted a link 48. The other end of the link 48 is pivotally connected to a gear 49 which meshes with a pinion 50 carried on the shaft of a motor 51. The motor 51 is connected by leads 52 to a power source 53. This mechanical action swings the receiving antenna reciprocally back and forth to scan for energy coming from the trail below, regardless of whether the trail be to the right or to the left of the line of flight.

The receiver 46 is energized by energy reflected from the trail when the reflector 39 is directed toward the trail. For indicating the moment of the angle of the reflector 39 at the moment when the receiver is energized, a visual indicator may be used such as a lamp 54 in a housing 55 mounted in a box 56. The front of the box 56 is provided with a ground glass screen 56a. The lamp 54 and housing 55 are reciprocally driven back and forth about a vertical axis by a journaled shaft 57, mechanically driven by arm 58, link 59, gear 60 and pinion 61 which is mounted on the shaft of a motor 62 connected to the power line 53. The motors 51 and 62 may be synchronous motors, and the mechanical gearing for the antenna reflector and the lamp of similar construction so that the lamp motion is synchronous at all times with the antenna reflector motion. The lamp 54 is connected by lines 54a to the output of the receiver 46 to be energized in response to the reception of an energizing signal by the receiver. The light from the lamp 54 is focused on the ground glass screen 56a and is observed by the eye of the pilot 57 as a spot of light 56b, corresponding in position to the position of the reflector 39 at the instant of signal reception from the trail.

*Operation Figs. 3, 4 and 5*

In the operation of the form of the invention shown in Figs. 3–5 the transmitter 31 produces a series of radiant energy pulses that are radiated from the antenna 32 in the form of a beam of radiant energy 28, as shown in Fig. 1, which is polarized in a plane perpendicular to the line of flight. This beam of radiant energy is received by the antenna 12, is transmitted over the transmission line 11 and is reradiated from the antenna 13 as a beam of radiant energy 29 which is polarized in the plane of flight.

The beam 29 is received by the receiving antenna 40 at the instant, in its oscillatory motion, when it is directed at the trail antenna 13. The received pulse from the antenna 37 is conducted over the line 45 to the receiver 46, which in turn causes the lamp 54 to light for an instant.

As the lamp 54 moves in synchronism with the antenna system 40 there will be produced a spot of light 56b on the ground glass screen 56a which will indicate by its position the amount and direction that the airplane is off the trail.

Various modifications of the arrangements of the plane installation are within the scope of the invention. The transmitter and receiver antenna may both be variably beamed for greater efficiency; the various moving parts may be mechanically driven in synchronization by a single motor; the receiver radiator may be tilted to receive more efficiently from a direction in front of the plane, and the transmitter radiator may be tilted to transmit more efficiently toward the rear of the plane; the system as a whole may be coordinated with devices for altimeter purposes and devices for revealing the geographical location of the plane in flight.

*Figures 6, 7, 8*

The modified form of aircraft installation shown in Figures 6, 7 and 8 allows for high speed scanning or sweeping of the radio trail, without mechanical motion. In these figures the transmitter radiations are arranged to be polarized with the electric field parallel to the line of flight, using a plurality of radiators that are energized in succession. The receiver is operated from a fixed antenna responsive to received radiations with the electric field polarized transverse to the line of flight. The trail for cooperating with such a device is arranged to be energized from longitudinal electric fields and to return transverse electric fields, as for example the trail of Fig. 1 with the line of flight toward the left, or a modified trail with transverse and longitudinal antennas distributed along a single transmission line.

In Fig. 6, the transmitter 158 producing the radar pulses is connected by concentric transmission line 158a to a coupling coil 159. This coil is coupled to a coil 160 one end of which is connected to a rotatable tube 161 and the other to an inner conductor of said tube. The coils 159—160 are so arranged that the mutual inductance between them is not varied during the rotation of tube 161. Between the center and outer conductors of the other end of the tube are connected two coils 162 and 163 in series. Preferably a condenser 64 may be inserted in the circuit as for example between breaks in the center conductor within the tube. The tube 161 is rotatably mounted in a grounded bearing which is attached to a motor 65. Secured to the shaft of the motor 65 is a pinion 66 which meshes with gears 67 and 68. The gear 67 is secured to the tube 161 and the gear 68 is attached to one end of a shaft 68a to the other end of which is secured a commutator 69 to be more fully described hereafter. The rotating coils 162 and 163 are used to energize coils 70, 71, 72, 73, 74, 75, 76, see Fig. 7, in succession, with couplings 162 and coupling coils 163 alternately operative. As indicated in Fig. 7 in which the line of flight is perpendicular to the plane of the paper the coil 163 is operative to energize coil 73. The coils 70—76 are connected by transmission lines to directional radiators 77 to 83, using suitable matching stubs if desired. These radiators 77 to 83 are rigidly fixed to the aircraft structure and are essentially similar to the radiator shown in Figs. 3 and 4 except that they provide for sending scanning beams to the right, center and left of the line of flight in succession.

The receiving antenna 85, see Fig. 6, may be curved in a similar manner to the transmitting antenna 32 shown in Fig. 4 and is connected to a receiver 86. The output of the receiver 86 is connected thru a line 113 to the signal circuit of an oscilloscope 87 which is shown as including a cathode 88, heated by filament 89, supplied by transformer 90 with current from line 91, a control grid 92, focusing grid 93, anode 94, vertical upward and downward deflecting plates 95 and 96, left and right deflecting plates 97 and 98, and a fluorescent screen 99. On the outside of the screen 99 a reference mark 100 is located centrally between the left and right, see Fig. 7, representing the tail view of the plane indicating the direction of flight as toward the interior of the oscilloscope. The electrodes of the oscilloscope have operating potentials applied thereto by battery 101 with positive end grounded and connected to the anode 94 and upper plate 95, and by battery 102 with negative end grounded. From the positive end of battery 102 to the negative end of battery 101 are connected bleeder resistors 103 to 109 in series, with the various sections suitably bypassed. The control grid 92 is connected through resistor 110 to the negative end of battery 101, the cathode to junction of resistors 109 and 108; and focusing grid 93 to junction of resistors 107 and 108 so that the control grid is negatively biased and the tube normally does not pass current. The control grid 92 is connected through condenser 111 and a resistor 112 to ground, and the junction of condenser 111 and resistor 112 is connected to the line 113 from the output of the receiver 86.

The lower plate 96 and the right plate 98 are positively biased with respect to the anode 94 and upper plate 95 by connection to the junction of resistors 103 and 104. A condenser 104a is shunted across resistor 104. Left plate 97 is connected through resistor 114 to the positive side of battery 102, and a condenser 115 is connected between the left plate 97 and ground. The left plate 97 is also connected through a line 116 to a brush 117 which engages commutator 69. A second brush 118, also engaging commutator 69, is connected to ground. The commutator 69, see Fig. 8, is provided with a conducting segment 119 which makes contact with brushes 117 and 118 twice every revolution of the commutator 69.

*Operation Figs. 6, 7 and 8*

In the operation of the form of the invention depicted in Figs. 6, 7 and 8, as the coils 162 and 163 rotate, the coils 70—76 will be successively energized causing the antennas 77—83 to successively radiate beams electrically polarized along the direction of the plane's flight. At the instant shown the antenna 80 is being energized, which sends a beam 80a in the direction of the trail antenna 120. If the trail is to the left of the line of flight, as indicated by the dotted trail antenna 121, it would be energized by the beam 81a from the antenna 81 an instant later.

When the trail antenna 120 is energized a transversely polarized wave will be returned from the antenna 122, which will be received by the receiving antenna 85, see Fig. 6, to actuate the receiver 86. The output of the receiver 86 comprises a series of positive pulses which drive the grid 92 positively toward cathode potential, thus causing an electron stream to flow when the pulses are present.

As previously described the conducting segment 119 of commutator 69 comes in contact with the brushes 117 and 118 twice every revolution. When this occurs, the condenser 104a is discharged and left plate 97 is momentarily brought to ground potential. The plates 95 and 96 have a fixed electric field between them which permanently deflects the electron stream downwards so that the spot of light 120, if any, occurs at a fixed distance below the reference mark 100. If used for altimeter purposes, the voltage across the plates 95 and 96 may be made variable in accordance with the height. When condenser 115 is discharged so that plate 97 is at ground potential, the electron stream is deflected in a direction outwardly perpendicular to the plane of the paper to produce a spot of light 120a at the right side of the screen 99, see Fig. 7. The gears 66, 67, 68, are so meshed that the condenser 115 is discharged when coil 70 is energized. After this discharge, the voltage on plate 97 builds up positively deflecting the spot of light 120 toward the left as seen in Fig. 7. The elements 102, 114, 115 are so proportioned that the spot of light 120 would travel from right to left, being centered directly under the reference mark 100 when the center radiator 80 is energized. If desired, the resistor 114 may be replaced by a constant current impedance such as the plate-cathode path of a pentode tube to assure linearity of sweep.

In this manner, the sweep is synchronized with the rotation of the distributor coils 162, 163, and the position of the spot of light 120 which is produced when received pulses actuate the grid 92, indicates the direction of the plane with respect to the trail.

*Figs. 9, 10 and 11*

When the plane is making a turn or when the air is rough and the plane is not in a horizontal position, the indicator may not show the true displacement of plane from the trail. In order to overcome this it is necessary to stabilize the sweeping systems, preferably with a gyroscopic stabilizer.

In order to accomplish this result a gyroscopic stabilizer or repeater 131, see Figs. 9 and 10, of any well known and standard construction, is supported from the casing 43 by means of a bracket 132. The stabilizer 131 is provided with a shaft 133 which is parallel to the longitudinal axis of the plane and which is held fixed in space about its longitudinal axis indepedent of the rolling of the plane either by a gyro control mechanism or by a stabilized repeater.

Secured to the shaft 133 is a gear 134 which meshes with an idler gear 135 which in turn meshes with an annular gear 136 mounted on the casing of a differential 137 which may be of any well known and standard construction. The gears 134 and 136 are in the ratio of 1:2. One side of the differential 137 is driven by the motor 51 by means of a gear 138 which meshes with the motor pinion 50. The other side of the differential 137 is connected to an arm 139 to the outer end of which is pivoted the link 48 for swinging the antenna system 39.

In the operation of the forms of the invention shown in Figs. 9 and 10 the antenna system 39 is driven by the motor 51 thru the differential 137 in a manner already described. As long as the plane maintains level flight the shaft 133 of the stabilizer 131 will remain fixed in space thus holding the casing of the differential 137 fixed.

When the plane banks in making a turn or in any other way is thrown out of a horizontal position, the entire mechanism will rotate about the fixed in space shaft 133 and gear 134. In so doing the casing of the differential 137 will be rotated thru the angle of tilt by means of the gears 134, 135 and 136. Due to the action of the differential 137 this will cause the arm 139 to be rotated thru twice the angle of tilt, which by means of the link 48, arm 47 and pivot 42 will cause the antenna system 39 to be rotated thru the angle of tilt, so that it will still maintain the same angular relation to the vertical plane that it would have if the plane were flying horizontally.

*Figure 11*

In Fig. 11 the stabilizer 131 is provided with the stabilized shaft 133 to which is attached a gear 141 which meshes with an annular gear 142 attached to the casing of a differential 143. The gears 141 and 142 are in the ratio 1:2. One side of the differential 143 is driven by the motor 65 by means of a gear 144 which meshes with the motor pinion 66. The other side of the differential 143 is connected to a gear 145 which meshes with a similar gear 146 mounted on the tube 161.

In the operation of the form of the invention shown in Fig. 11 the coils system 162—163 is driven by the motor 65 thru the differential 143 in a manner already described. When the plane moves out of a horizontal position the entire mechanism will rotate about the shaft 133 and gear 141. In so doing the casing of the differential 143 will be rotated thru half the angle of tilt. Due to the action of the differential 143 this will cause the coil system 162—163 to be rotated thru the full angle of tilt, so that it will maintain the same angular relation to the vertical plane that it would have if the plane were flying horizontally.

The same result may be accomplished by causing the stabilizing means, such as the gyro stabilizer 131 or a standard artificial horizon, to vary a voltage in proportion to the inclination of the plane to the horizontal. This variable voltage could be superimposed upon the horizontal scanning voltage applied to the plates 97—98 and would cause the cathode ray beam to assume the proper position 120 on the screen 99 relative to the mark 100 to compensate for the inclination of the plane to the horizontal.

As the plane tilted this would reduce the range of scanning on the down side of a tilt and increase it on the up side. This fact could be used to advantage to increase the range of scanning by alternately rocking the plane from one side to another.

*Figure 12*

In Fig. 12, the equipment at the top of the drawing is located in an aircraft, which at the instant shown is tilted at an angle with the horizontal. Three radiators 171, 172, 173 are mounted at the surface 174 of the aircraft, with directivity in a generally downward direction, so that a beamed wave from these radiators will be capable of energizing a trail 175. These radiators are energized by high frequency generator 176 to which the radiators are connnected by transmission lines or wave guides, with radiator 172 energized direct, radiator 171 through phase shifters 177 and 178 in series and radiator 173 through phase shifters 179 and 180 in series. Phase shifters 177 and 180 are controlled by a compensator mechanism 181 with driving shaft 182 gearing 183 shaft 184 and gearing 185 such that motion of the shaft 182 causes a change of the phases in opposite sense for the two phase shifters. Mechanism 181 turns the shaft 182 so that its integrated angle of turn is proportional to the angle of inclination of the craft, and the phase shifters are so arranged and proportioned that with shifters 178 and 179 at mid adjustment there is a quicker electrical path from generator 176 to radiator 173 than from generator 176 to radiator 171 so that radiator 173 is energized with advanced phase and radiator 171 with retarded phase with respect to radiator 172 to produce a beam which is directed vertically downward at all times regardless of the roll of the craft. These shifters 178 and 179, however, are geared together so that their settings may change simultaneously with a change of the frequency adjustment of an amplitude modulator 186 which pulses the generator 176. Hand wheel 187 is coupled both to the modulator 186 and the phase shifter 178 and by gears 188, shaft 189, gears 190, changes the phase shifters 178 and 179 together in unison, and in a reverse sense. This phase shifting swings the radiation pattern laterally to the left or right depending upon the setting of the wheel 187 and moreover causes the pulse rate to be different when the beam is directed laterally to the left than when directed laterally to the right. The energy reflected or returned to the craft from the trail 175 will be at a pulse rate determined by the direction with respect to the vertical above the trail from which the trail was energized. These reflected signals may be used to indicate to the pilot the angular departure from the proper trail course.

While the system is shown with manual phase shifting to swing the beam, the mechanism may be driven by a motor to sweep at a controlled rate, or electrical phase shifting and frequency changing means may be used.

In the embodiment of Fig. 12 the angle of the beam is automatically compensated for the angle of tilt of the plane by the mechanism 181 which may constitute a stabilized member of any type such as a roll meter, gyro stabilized mechanism or inclinometer, with repeater, servomotor or other follow-up. The beam is shown as variably modulated as a function of deflection although the receiver may be synchronized with the swinging of the beam as in Fig. 6 or the radiators of Fig. 6 may be differently modulated as indicated in Fig. 12 in which event the received signal would indicate the angle of deflection of the beam. The received signal may be connected to control the deflection of the electron stream of the oscilloscope or to actuate other indicating means such as a row of lights selectively actuated by the received signals. Instead of stabilizing the beam, the indicator such as the cathode ray screen may be provided with a stable vertical to act as a reference point.

Although certain specific examples have been set forth in detail, it is to be understood that the invention may be adapted to various uses and that suitable modifications and changes may be made as will appear to a person skilled in the art. The invention is only to be limited in accordance with the scope of the following claims.

What is claimed is:

1. In a system for determining the position of an aircraft laterally with respect to a line of reflectors, a transmitter on said craft including an array of radiators disposed in a line transversely of said craft, a source of high-frequency energy, and means for applying energy from said source to said radiators including separate channels respectively for the radiators to the left and to the right of the center of said transverse line, said left and right channels each including two cascade connected phase shifters; stabilizer means including an output shaft and means for maintaining said output shaft in an angular position corresponding to lateral tilt of said aircraft, means connecting said shaft to one phase shifter in each of said channels so as to differentially shift the phases of energization of said left and right radiators, whereby the direction of resultant radiation from said array is substantially independent of said lateral tilt; control means connected to the other phase shifter in each of said channels for differentially shifting the phases of energization of said left and right radiators to control the direction of resultant radiation from said array, a source of modulating energy for said high frequency source and means connected to said control means for varying the frequency of said modulating source, whereby the frequency of modulation of the energy radiated by said array is characteristic of the direction of said radiation.

2. In a system for determining the position of an aircraft laterally with respect to a line of reflectors, a transmitter on said craft including an array of radiators disposed in a line transversely of said craft, a source of high-frequency energy, and means for applying energy from said source to said radiators including separate channels respectively for the radiators to the left and to the right of the center of said transverse line, said left and right channels each including a phase shifter; control means connected to the phase shifter in each of said channels for differentially shifting the phases of energization of said left and right radiators to control the direction of resultant radiation from said array; a source of modulating energy for said high frequency source and means connected to said control means for varying the frequency of said modulating source, whereby the frequency of modulation of the energy radiated by said array is characteristic of the direction of said radiation.

3. In a system for determining the position of an aircraft laterally with respect to a line of reflectors, a transmitter on said craft including an array of radiators disposed in a line transversely of said craft, a source of high-frequency energy, and means for applying energy from said source to said radiators including separate channels respectively for the radiators to the left and to the right of the center of said transverse line, said left and right channels each including a phase shifter; and stabilizer means responsive to lateral tilt of said aircraft to control the phase shifter in each of said channels so as to differentially shift the phases of energization of said left and right radiators, whereby the direction of resultant radiation from said array is substantially independent of said lateral tilt.

4. In a system for determining the position of an aircraft laterally with respect to the vertical projection of a line on the ground, a plurality of trail elements at spaced locations along said line, each of said trail elements comprising two antennas polarized substantially at right angles to each other and means supplying to one of said antennas radio energy which is picked by the other of said antennas; a transmitter on said craft provided with an antenna polarized in one direction with respect to the longitudinal axis of said craft and a receiver on said craft provided with an antenna polarized substantially at right angles to said transmitter antenna; means forming the directive pattern of at least one of said antennas on said craft into a beam, and means swinging said beam from side to side transversely of said craft; means characteristically modulating said transmitter in accordance with the position of said beam, and indicator means connected to said receiver and responsive to the modulation of signals received by said receiver to indicate the position of said beam when said signals are received, the directions of polarization of said two antennas of each of said trail elements being parallel respectively to said transmitter and receiver antennas on said aircraft when said longitudinal axis of said craft is parallel to said line on the ground, whereby radio signals transmitted from said aircraft to said trail element and retransmitted from said trail element are received by said receiver on said aircraft with much greater strength than signals which are transmitted from said aircraft and reflected from the ground.

5. A system for determining the location of a plane or the like with respect to a reflecting radio trail, comprising a transmitter on the plane having means to transmit a directed radio beam toward the ground, means swinging said beam transversely to scan for said trail, means for modulating said transmitter at a frequency which varies in accordance with the angle of said beam with respect to a reference line, a receiver on said plane adapted to receive energy reflected from said trail in response to energization thereof by said beam, and indicating means responsive to the modulation frequency of said received energy to indicate the angular displacement of said beam at the instant of reception of said reflected beam, wherein said transmitter transmits energy polarized substantially in a single plane and said receiver responds substantially only to energy polarized in a plane at right angles thereto, and said radio trail comprises a plurality of reflectors at spaced intervals along a line on the ground which is the vertical projection of the path to be followed by said plane, each of said reflectors comprising two substantially horizontal antennas spaced apart along said line and polarized substantially at right angles of each other, and a transmission line connected between said antennas.

JOHN HAYS HAMMOND, JR.
ELLISON S. PURINGTON.

REFERENCES CITED

The following references are of record in the file of this patent:

UNITED STATES PATENTS

| Number | Name | Date |
|---|---|---|
| 1,525,783 | Trenor | Feb. 10, 1925 |
| 2,134,716 | Gunn | Nov. 1, 1938 |
| 2,153,209 | Scharlau | Apr. 4, 1939 |
| 2,207,709 | Bates | July 16, 1940 |
| 2,257,320 | Williams | Sept. 30, 1941 |
| 2,272,312 | Tunick | Feb. 10, 1942 |
| 2,311,435 | Gerhard | Feb. 16, 1943 |
| 2,396,112 | Morgan | Mar. 5, 1946 |
| 2,407,169 | Loughren | Sept. 3, 1946 |
| 2,408,848 | Hammond | Oct. 8, 1946 |
| 2,423,644 | Evans | July 8, 1947 |
| 2,426,189 | Espenschied | Aug. 26, 1947 |
| 2,432,984 | Budenbom | Dec. 23, 1947 |
| 2,433,804 | Wolff | Dec. 30, 1947 |

FOREIGN PATENTS

| Number | Country | Date |
|---|---|---|
| 151,389 | Great Britain | Sept. 30, 1920 |
| 804,966 | France | Nov. 6, 1936 |